United States Patent [19]

Mohns

[11] Patent Number: 5,228,536
[45] Date of Patent: Jul. 20, 1993

[54] MOTORCYCLE OIL DRAIN TUBE

[76] Inventor: Bradley W. Mohns, R.R. 1, Box 204, Round Lake, Minn. 56167

[21] Appl. No.: 907,585

[22] Filed: Jul. 2, 1992

[51] Int. Cl.$^5$ .................................. F16N 33/00
[52] U.S. Cl. ........................ 184/1.5; 123/196 R; 180/219; 222/530
[58] Field of Search .................. 180/219, 225, 229; 184/1.5, 105.3, 105.1; 123/196 R; 222/530, 538

[56] References Cited

U.S. PATENT DOCUMENTS

| | | | |
|---|---|---|---|
| 2,053,533 | 9/1936 | Rizor | 222/530 |
| 2,781,859 | 2/1957 | Warren | 180/229 |
| 3,103,947 | 9/1963 | Mueller | 184/1.5 |
| 3,867,999 | 2/1975 | Cox | 184/1.5 |
| 4,033,432 | 7/1977 | Bernstein | 184/1.5 |
| 4,702,339 | 10/1987 | Hayashi et al. | 180/219 |
| 4,875,884 | 10/1989 | Meisenburg | 184/1.5 |
| 4,951,723 | 8/1990 | Hoeptner, III | 184/1.5 |
| 4,977,978 | 12/1990 | Batrice | 184/1.5 |
| 5,054,571 | 10/1991 | Takasaka | 180/219 |
| 5,056,621 | 10/1991 | Trevino | 184/1.5 |

Primary Examiner—Ira S. Lazarus
Assistant Examiner—Alan B. Cariaso

[57] ABSTRACT

An oil drain for motorcycles adapted to keep drain oil away from the frame of the cycle. The drain includes a combination plug and attachment clip to simplify use of the device.

2 Claims, 1 Drawing Sheet

MOTORCYCLE OIL DRAIN TUBE

BACKGROUND AND SUMMARY OF THE INVENTION

This invention pertains to an oil drainage device, particularly adapted to motorcycles, to ease and keep clean the process of draining crank case oil from the engine of such a machine.

Many motorcycles today are equipped with four-stroke cycle engines having an oil sump which drains to one side just in front of the rear wheel. This is especially true of those manufactured by the Harley Davidson Company, but many others are similarly equipped. Draining the motor oil from such a sump requires simple removal of a drain plug and allowing the oil to flow from the engine into an external catchment.

The problem arises because most cycles have structure below the drain plug and waste oil frequently drains onto the frame, exhaust or other structure near the outlet from the oil sump.

By my invention I provide for carrying the waste oil away from the structure of the cycle. This is made convenient because of a unique combination of tube plug and attachment means in connection with the device for carrying the oil.

DESCRIPTION

Figure 3:
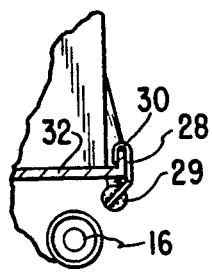
FIG. 3 is a sectional view from line 3—3 of FIG. 1.
Figure 1:
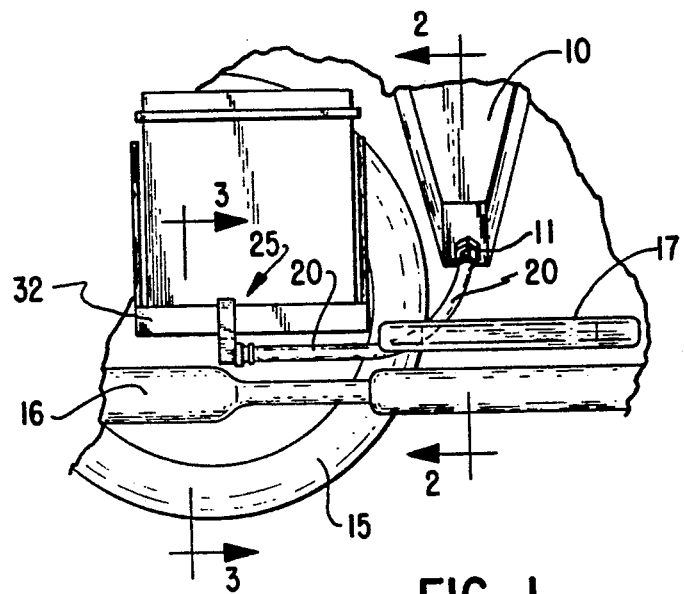
FIG. 1 is a partial elevational view of a motorcycle showing the drain device of my invention in place.
Figure 4:
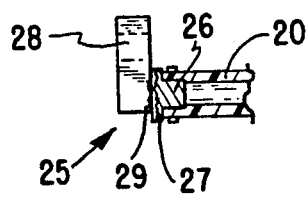
FIG. 4 is a detailed view to an enlarged scale of the combined plug and hanger device.
Figure 2:
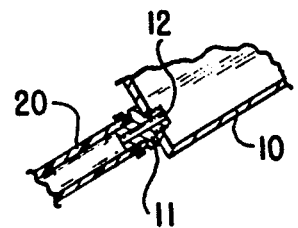
FIG. 2 is a sectional view from line 2—2 of FIG. 1.

Briefly my invention comprises a device for attachment to the oil sump of a motorcycle to lead waste oil away from the cycle during oil draining and a combination plug and hanger to hold the oil and store the device when using the cycle.

More specifically and with reference to the figures, the device is designed for use with a typical motorcycle. Such cycles use a frame on which an engine is mounted. The usual four-stroke engine will include an oil sump 10 to hold the lubricating oil used on the engine parts. Because all motor oil tends to break down with usage, to collect moisture from condensation in the system, and otherwise to deteriorate, all such engines provide for drainage of waste oil and replacement with fresh oil. Drainage of the waste oil is normally through an opening in the sump. That opening is usually blocked by a drain plug 11. In this novel device the plug 11 is modified by having a hole 12 formed through it so that it is no longer truly a plug but rather is a nipple adapted to conduct drain oil from the sump 10 to the exterior.

The sump 10 is typically located just to one side of the engine and in front of the rear wheel 15. Also, the frame or the exhaust stacks 16 or other structure 17 is frequently located beneath and beyond the sump 10. This results in a spillage of waste oil onto those parts of the cycle, thus requiring cleaning of the other structure each time the oil is changed.

To avoid that cleaning in the present device, a flexible tube 20 is provided. The tube is fitted over the fitting 11 so that the opening 12 allows oil to flow from the sump 10 through the opening 12 into the tube 20. Thus the tube can conduct the waste oil past the structure of the cycle to an external catchment (not shown).

However, in order to hold oil during the operation of the engine, it is necessary to plug the tube 20 to prevent the flow of oil. This can be readily accomplished by any of several means. A threaded fitting to receive a cap or plug could be provided at the free end of the tube. A simple plug extending into the tube and held in place by a hose clamp might be used. As illustrated, a simple plug which fits tightly into the tube is shown. However, by my invention, I provide a combination plug 25 for also stowing the plug and holding the free end of the tube in place.

The combination plug as best shown in FIG. 5 includes a solid plug end 26 inserted into the tube 20. A ring 27 on the plug prevents the plug end 26 from being inserted too far into the tube 20. A clip 28 is fixed to the portion 29 of the plug extending beyond the ring 27.

The clip 28 is formed of a strip of sheet metal, and includes an inverted V-shaped part 30 (FIG. 3) forming a hook adapted to be hooked over the flange 32 of a battery carrier pan ordinarily mounted on the cycle near the rear wheel 15. Thus, the free end of the tube 20 is held positively out of the way of other operating parts of the cycle, and is firmly plugged. It should be noted, particularly in the illustrated environment which is typical of Harley Davidson cycles, that the clip 25 can be clipped at a variety of places along the flange 32 of the battery pan so that the length of the tube and the sharpness of the bend in the tube is not at all critical, but can vary over a fairly wide range without interfering in any way with the use of the device.

In use, when it is desired to drain the oil from the sump 10, the hook 30 is simply removed from the flange 32. The now freed end of the tube 20 can then be placed over the catchment device and the plug end 26 removed from the tube 20. The oil then will flow from the sump through the tube until the sump is substantially drained. At that time the plug end 26 can be replaced and fresh oil poured into the engine finding its way to the sump. The hook 30 is replaced over the flange of the battery pan and the cycle is again ready for use with fresh motor oil.

I claim:

1. For use with a motorcycle having an engine with an oil sump and a battery pan on said motorcycle near said oil sump, oil drain means including a fitting in said sump, said fitting having an opening therethrough, tube means having one end connected to said fitting, said tube also having a free end, plug means releasably plugging said free end, said plug means being formed to be releasably attached to said battery pan.

2. The oil drain means of claim 1 in which said plug means is formed with a hook, said battery pan including a flange, said hook being engageable with said flange.

* * * * *